(12) United States Patent
Takama

(10) Patent No.: US 10,701,332 B2
(45) Date of Patent: Jun. 30, 2020

(54) IMAGE PROCESSING APPARATUS, IMAGE PROCESSING METHOD, IMAGE PROCESSING SYSTEM, AND STORAGE MEDIUM

(71) Applicant: CANON KABUSHIKI KAISHA, Tokyo (JP)

(72) Inventor: Yasufumi Takama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 16/134,642

(22) Filed: Sep. 18, 2018

(65) Prior Publication Data

US 2019/0098277 A1 Mar. 28, 2019

(30) Foreign Application Priority Data

Sep. 22, 2017 (JP) ................................. 2017-182795

(51) Int. Cl.
*H04N 1/04* (2006.01)
*H04N 13/111* (2018.01)
(Continued)

(52) U.S. Cl.
CPC .............. *H04N 13/111* (2018.05); *G06T 7/55* (2017.01); *G06T 7/70* (2017.01); *G06T 15/20* (2013.01);
(Continued)

(58) Field of Classification Search
USPC ........ 348/42, 47, 48, 51; 386/223, 224, 239, 386/326, 335
See application file for complete search history.

(56) References Cited

U.S. PATENT DOCUMENTS 6,373,487 B1 * 4/2002 Culbertson ............. G06T 17/00
345/424
6,525,731 B1 * 2/2003 Suits ....................... G06T 15/04
345/421
(Continued)

FOREIGN PATENT DOCUMENTS

JP 2000348213 A 12/2000
JP 2002157603 A 5/2002
(Continued)

OTHER PUBLICATIONS

Kensuke Hisatomi et al; 3D Archive System for Traditional Performing Arts; International Journal of Computer Vision, vol. 94, No. 1, pp. 78-88, 2011.
(Continued)

*Primary Examiner* — Daquan Zhao
(74) *Attorney, Agent, or Firm* — Canon U.S.A., Inc. IP Division

(57) ABSTRACT

An image processing system that generates a virtual viewpoint image based on a plurality of captured images acquired by capturing an image of an image capturing target region from a plurality of directions using a plurality of cameras includes a storage control unit that stores, in a storage unit, visibility information about an element of a three-dimensional shape model of an object whose image is captured by at least one of the plurality of cameras, an acquisition unit that acquires viewpoint information indicating one or more virtual viewpoints, and an image generation unit that generates one or more virtual viewpoint images corresponding to the one or more virtual viewpoints identified by the viewpoint information, based on the plurality of captured images, the three-dimensional shape model, and the visibility information stored in the storage unit.

19 Claims, 7 Drawing Sheets

(51) Int. Cl.

| | | |
|---|---|---|
| *H04N 13/00* | (2018.01) | |
| *G06T 17/00* | (2006.01) | |
| *G06T 15/20* | (2011.01) | |
| *G06T 7/55* | (2017.01) | |
| *G06T 7/70* | (2017.01) | |
| *G06T 17/20* | (2006.01) | |
| *H04N 5/247* | (2006.01) | |
| *H04N 9/80* | (2006.01) | |
| *H04N 5/92* | (2006.01) | |
| *H04N 5/89* | (2006.01) | |

(52) U.S. Cl.
CPC .......... *G06T 15/205* (2013.01); *G06T 17/00* (2013.01); *G06T 17/20* (2013.01); *H04N 5/247* (2013.01); *H04N 13/00* (2013.01); *G06T 2207/10028* (2013.01); *G06T 2207/20221* (2013.01)

(56) References Cited

U.S. PATENT DOCUMENTS

2012/0314932 A1* 12/2012 Nakayama ......... G06K 9/00362 382/154
2013/0321396 A1 12/2013 Kirk
2014/0354632 A1 12/2014 Alj

FOREIGN PATENT DOCUMENTS

| JP | 2014-032443 A | 2/2014 |
| JP | 2015-045920 A | 3/2015 |
| JP | 201545920 A | 3/2015 |
| JP | 5945255 B2 | 7/2016 |
| JP | 2017509972 A | 4/2017 |

OTHER PUBLICATIONS

Wojciech Matusik; Image-Based 3D Photography Using Opacity Hulls; ACM Transactions on Graphics, pp. 427-437, 2002.
Arpad Huszak; Advanced Free Viewpoint Video Steaming Techniques; Multimed Tools Appl, vol. 76, No. 1, pp. 373-396, 2015.
Laura Toni; In-Network View Synthesis for Interactive Multiview Video Systems; IEEE Transactions on Multimedia, vol. 18, No. 5, pp. 852-864, 2016.

* cited by examiner

IMAGE PROCESSING APPARATUS, IMAGE PROCESSING METHOD, IMAGE PROCESSING SYSTEM, AND STORAGE MEDIUM

BACKGROUND OF THE INVENTION

Field of the Invention

The present invention relates, in particular, to an image processing system for generating a virtual viewpoint image.

Description of the Related Art

There are needs for generating, in real time, images of virtual cameras (hereinafter, "virtual viewpoint images") placed in positions and orientations in a virtual space from images acquired by capturing images of a subject using cameras (hereinafter, "real cameras") placed in a plurality of different positions and orientations in the real world. If this is realized, for example, users can view a highlight of a soccer or basketball game from various angles to feel a high realistic sensation compared with normal viewings such as viewings on televisions.

However, it is difficult to generate virtual viewpoint images in a short time because it takes a long time to execute shape estimation processing to estimate a three-dimensional shape (hereinafter, "shape model") of a subject from a plurality of images and visibility judgement processing to judge whether the shape model is visible from cameras. To solve this issue, Japanese Patent No. 5945255 discusses a method of generating a virtual viewpoint image at high speed based on a geometrical relationship between a camera and a virtual camera.

One of the cases in which a user views a virtual viewpoint image is a case of viewing a plurality of virtual viewpoint images. One example is a case of simultaneously viewing a virtual viewpoint image for viewing players in close-up and a virtual viewpoint image for viewing the movements of the players on a ground from a higher perspective, and another example is a case in which a large number of audiences at a venue respectively operate virtual cameras using a smartphone to view images. If the shape estimation processing and the visibility judgement processing described above are performed for each virtual viewpoint to generate a plurality of virtual viewpoint images at the same time, the amount of information for performing these processing becomes enormous. The technique discussed in Japanese Patent No. 5945255 requires an enormous amount of information to generate a plurality of virtual viewpoint images because the shape estimation processing and the visibility judgement processing are dependent on the virtual cameras. Especially, the number of range images required for the visibility judgement processing increases according to the size of captured images and the number of cameras, so that generating a plurality of virtual viewpoint images leads to an increase in transfer time and data amount.

SUMMARY OF THE INVENTION

According to an aspect of the present invention, an image processing system for generating a virtual viewpoint image based on a plurality of captured images acquired by capturing an image of an image capturing target region from a plurality of directions using a plurality of cameras includes a storage control unit configured to store, in a storage unit, visibility information about an element of a three-dimensional shape model of an object whose image is captured by at least any of the plurality of cameras, wherein the visibility information indicates for each of one or more captured images among the plurality of captured images whether a pixel corresponding to the element is included in the captured image, an acquisition unit configured to acquire viewpoint information indicating one or more virtual viewpoints, and an image generation unit configured to generate a virtual viewpoint image corresponding to the one or more virtual viewpoints identified by the viewpoint information acquired by the acquisition unit, based on the plurality of captured images, the three-dimensional shape model, and the visibility information stored in the storage unit by the storage control unit.

Further features of the present invention will become apparent from the following description of exemplary embodiments with reference to the attached drawings.

DESCRIPTION OF THE EMBODIMENTS

In a first exemplary embodiment, an example will be described in which visibility information about an estimated shape model of a subject is stored and thereafter a plurality of virtual viewpoint images is generated using the visibility information. As used herein, the term "visibility information" refers to information indicating whether an element of the shape model is visible/invisible from each of a plurality of cameras (real cameras) located in different positions and orientations in the real world. Further, the visibility information can also be defined as judgement information about an element of a shape model representing the shape of an object of an image captured by at least any of a plurality of cameras. The judgement information indicates whether a pixel corresponding to the element is included in the captured image. Hereinafter, an element of a shape model will be described as a three-dimensional point. The element of the shape model is not limited to the foregoing, and the presence/absence of a subject can be represented by a 1-bit flag or information such as a mesh to represent the subject. In other words, the element of the shape model is a point in a case where the shape model is represented as a set of points, or a mesh in a case where the shape model is represented as a set of meshes. Representing the shape model as a set of points is advantageous in that it enables detailed reproduction of the shape of the object, and representing the shape model as a set of meshes is advantageous in that it can reduce the data amount of the shape model. While the case in which the virtual viewpoint image is a still image will mainly be described in the present exemplary embodiment, the virtual viewpoint image can be a moving image.

[System Configuration]

Figure 1:
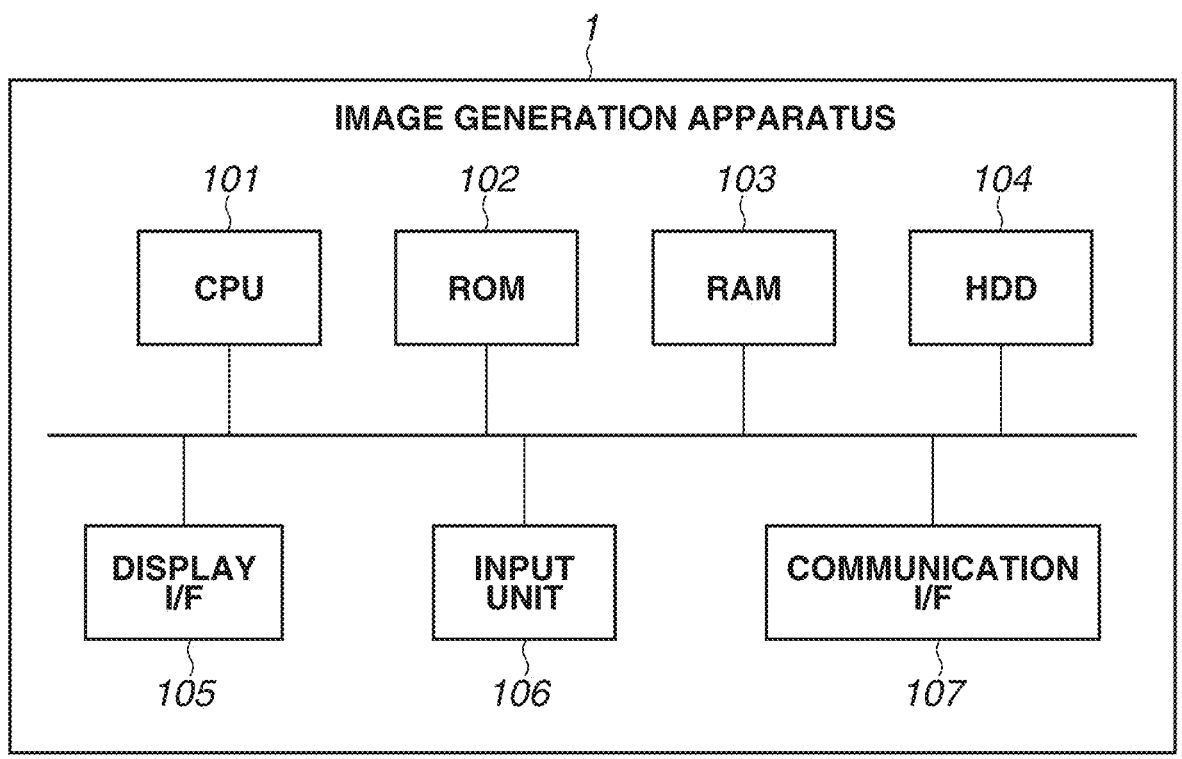
FIG. 1 illustrates an example of a hardware configuration of an image generation apparatus according to an exemplary embodiment.
Figure 2:
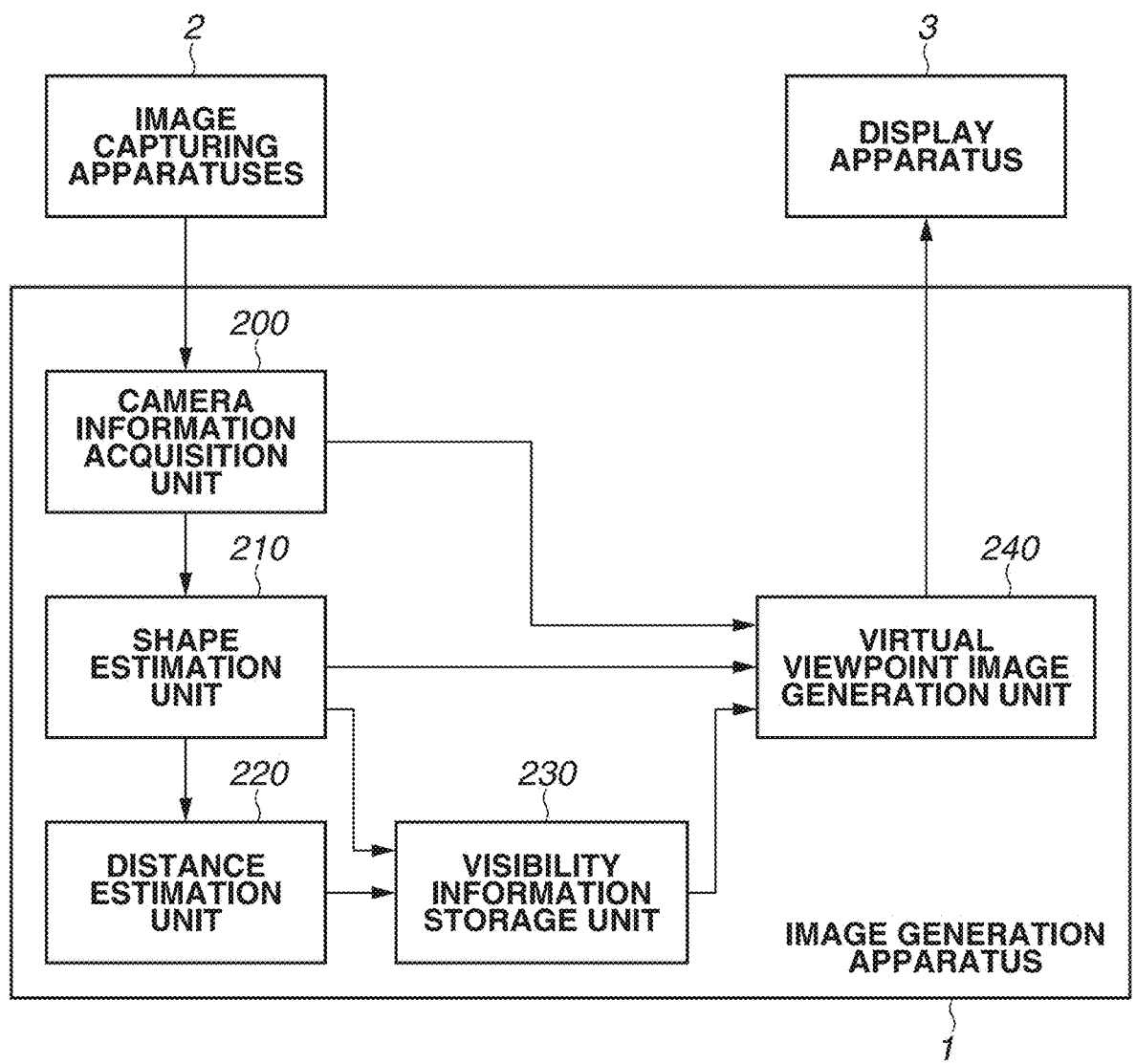
FIG. 2 is a block diagram illustrating an example of a functional configuration of an image processing system according to a first exemplary embodiment.

Various exemplary embodiments of the invention will be described below with reference to the drawings. Each of the embodiments of the present invention can be implemented solely or as a combination of a plurality of the embodiments or features thereof where necessary or where the combination of elements or features from individual embodiments in a single embodiment is beneficial. A configuration of an image processing system configured to generate and output a virtual viewpoint image will be described below with reference to FIGS. 1 and 2. FIG. 1 illustrates an example of a hardware configuration of an image generation apparatus 1 according to exemplary embodiments. FIG. 2 is a block diagram illustrating an example of a functional configuration of the image processing system according to a first exemplary embodiment. The image processing system in the present exemplary embodiment includes the image generation apparatus 1, image capturing apparatuses 2, and a display apparatus 3.

The example of the hardware configuration of the image generation apparatus 1 illustrated in FIG. 1 will be described below.

The image generation apparatus 1 includes a central processing unit (CPU) 101, a read-only memory (ROM) 102, a random-access memory (RAM) 103, a hard disk drive (HDD) 104, a display interface (I/F) 105, an input unit 106, and a communication interface (I/F) 107. The CPU 101 reads a control program stored in the ROM 102 to execute various types of processing. The RAM 103 is used as a main memory of the CPU 101 and a temporary storage area such as a work area. The HDD 104 stores various types of data, programs, etc. The display I/F 105 outputs various types of information to the display apparatus 3. The input unit 106 includes a keyboard or a mouse and receives various user operations.

The communication I/F 107 performs communication processing with an external apparatus via a network. Alternatively, the communication I/F 107 can wirelessly communicate with the external apparatus.

The CPU 101 reads a program stored in the ROM 102 or the HDD 104, and executes the program to realize the functions and processing of the image generation apparatus 1 described below. Alternatively, the CPU 101 can read a program stored not in the ROM 102, etc. but in a recording medium such as a secure digital (SD) card.

While a single processor (CPU 101) of an image generation apparatus executes the processes illustrated in a below-described flowcharts using a single memory (ROM 102) in the exemplary embodiments, any other form can be employed. For example, a plurality of processors, a plurality of RAMs, a ROM, and a storage can cooperate to realize the processes illustrated in the flowcharts. A hardware circuit can be used to execute part of the processes. Further, a processor other than a CPU can be used to realize the functions and processing of the image generation apparatus 1 described below, (For example, a graphics processing unit (GPU) can be used in place of the CPU.)

The image processing system according to the present exemplary embodiment will be described below with reference to FIG. 2.

The image generation apparatus 1 acquires from the communication I/F 107 images captured at the same time point by the image capturing apparatuses 2 and camera parameters of the respective real cameras, and generates a virtual viewpoint image. Then, the image generation apparatus 1 transmits the generated virtual viewpoint image to the display apparatus 3 via the display I/F 105. The camera parameters include an external parameter and an internal parameter. The external parameter is a parameter regarding a placement state of the camera, and examples include information about the positions and orientations of the cameras. The internal parameter is a parameter regarding a camera state, and examples include information about the focal lengths of the real cameras and information about the central coordinates of an image sensor.

The image capturing apparatuses 2 include a plurality of real cameras, and the real cameras capture images of a subject from different directions, respectively. In the present exemplary embodiment, each of the plurality of real cameras of the image capturing apparatuses 2 has a camera number for identifying the camera. The real cameras are connected to the image generation apparatus 1, and transmits images captured by the real cameras and the camera parameters of the real cameras to the image generation apparatus 1. The real cameras are synchronized according to a single piece of time point information of the real world, and time point information is given to each captured image. The camera parameters can be transmitted in synchronization with a captured image or can be transmitted prior to image capturing or asynchronously as needed.

The display apparatus 3 receives the images generated in the image generation apparatus 1 and displays the virtual viewpoint images.

The image generation apparatus I includes a camera information acquisition unit 200, a shape estimation unit 210, a distance estimation unit 220, a visibility information storage unit 230, and a virtual viewpoint image generation unit 240.

The camera information acquisition unit 200 acquires, from the image capturing apparatuses 2 via the communication I/F 107, the images captured at the same time point by the plurality of real cameras and the camera parameters of the real cameras, as camera information. The shape estimation unit 210, the distance estimation unit 220, the visibility information storage unit 230, and the virtual viewpoint image generation unit 240 acquire the camera parameters from the camera information acquisition unit 200.

The shape estimation unit 210 estimates a three-dimensional shape of the subject based on the captured images and the camera parameters. Then, the shape estimation unit 210 outputs a shape model as a shape estimation result to the distance estimation unit 220, the visibility information storage unit 230, and the virtual viewpoint image generation unit 240.

The distance estimation unit 220 estimates the distance between each point of the shape model and a position according to the camera using the shape model and the camera parameters, and outputs such distance information to the visibility information storage unit 230. The position according to the camera may be a position of an image capturing surface (an imaging sensor) of the camera.

The visibility information storage unit 230 judges the visibility which indicates whether each point or element of the shape model is visible from each real camera, using the shape model and the distance information, and stores a result of the judgement in the HDD 104. The visibility information storage unit 230 can also store at least one of the shape model and the distance information in addition to the visibility judgement information.

To generate a single virtual viewpoint image, the virtual viewpoint image generation unit 240 receives a designation of a virtual viewpoint based on virtual viewpoint information (a camera parameter of a virtual camera) and generates a virtual viewpoint image based on the designation. A user (operator) attempting to designate a virtual viewpoint operates the input unit 106 to designate the virtual viewpoint information. The designation of the virtual viewpoint information is not limited to the foregoing and can be performed by recognizing a subject, etc. The generated virtual viewpoint image is output to the display apparatus 3. It is not required to include all the functional units illustrated in FIG. 2 in the single image generation apparatus 1. For example, a first apparatus including the camera information acquisition unit 200, the shape estimation unit 210, and the distance estimation unit 220, a second apparatus including the visibility information storage unit 230, and a third apparatus including the virtual viewpoint image generation unit 240 can communicably be connected one another. Further, in this case, a plurality of third apparatuses including the virtual viewpoint image generation unit 240 can be connected to the second apparatus including the visibility information storage unit 230. This configuration enables the plurality of virtual viewpoint image generation units 240 to share the information stored in the visibility information storage unit 230 to efficiently generate a plurality of virtual viewpoint images.

[Operation Flow]

Figure 3:
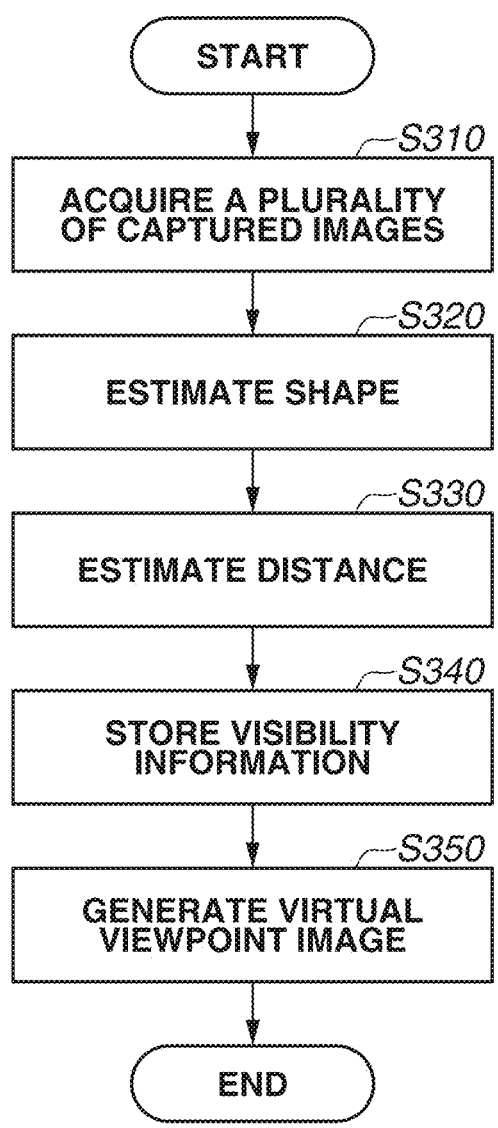
FIG. 3 is a flowchart illustrating a process of generating a virtual viewpoint image in the first exemplary embodiment.

A process of the image generation apparatus 1 will be described in detail below with reference to FIG. 3. In a flowchart of FIG. 3, step S310 is a step of acquiring images captured at the same time point by the plurality of real cameras and the camera parameters of the respective cameras, step S320 is a step of performing shape estimation processing, and step S330 is a step of performing distance estimation processing. Further, step S340 is a step of performing visibility judgement processing and storing a result of the judgement, and step S350 is a step of generating and outputting a plurality of input virtual viewpoint images. The process will be described in detail below.

<Step S310>

In step S310, the camera information acquisition unit 200 acquires, as camera information, images captured at the same time point by the real cameras and camera parameters of the real cameras. Then, the camera information acquisition unit 200 transmits the acquired camera parameters to the shape estimation unit 210, the distance estimation unit 220, the visibility information storage unit 230, and the virtual viewpoint image generation unit 240. Also, the camera information acquisition unit 200 transmits the images captured by the real cameras to the shape estimation unit 210.

<Step S320>

In step S320, the shape estimation unit 210 acquires the images captured by the real cameras and the camera parameters of the real cameras, and estimates a three-dimensional shape of the subject. Then, the shape estimation unit 210 transmits a shape model that is a result of the estimation to the distance estimation unit 220, the visibility information storage unit 230, and the virtual viewpoint image generation unit 240.

The three-dimensional shape estimation processing includes, for example, a process of generating a silhouette image of the subject (specific object in captured image) and a process of estimating a three-dimensional shape. The silhouette image is, for example, a binary image in which a subject region is displayed in white and the other regions in black. The contents of the silhouette image are not limited to the foregoing and can be any information that identifiably indicates a region corresponding to a specific object in a captured image. The silhouette image is generated from the captured images of the subject by a commonly-used method such as a background difference method in which a difference from a background image captured in advance in the absence of the subject is calculated and a region having a value greater than or equal to a threshold value is determined as a silhouette (foreground region). The silhouette image generation method, however, is not limited to the foregoing method. For example, a method in which a human body as a subject is detected by image recognition to generate a silhouette image or a method in which a moving object is detected to generate a silhouette image of a moving object region can be used.

Then, the shape estimation unit 210 estimates a three-dimensional shape of the subject using the generated silhouette images of all the real cameras and the camera parameters. A known method such as a visual hull method can be used to estimate the three-dimensional shape. As a result of the estimation processing, a three-dimensional (3D) point group (set of points having three-dimensional coordinates) representing the shape model of the subject is acquired. Coordinates $X_w$ of the 3D point group are represented by, for example, a world coordinate system having three orthogonal axes (x-axis, y-axis, and z-axis) with an origin being a position in the real world. The shape model of the subject can be represented by a set of a plurality of meshes. In the three-dimensional shape estimation (three-dimensional model generation), it is not indispensable to use the captured images of all of the cameras, and the three-dimensional shape estimation can be performed based on one or more captured images.

<Step S330>

In step S330, the distance estimation unit 220 acquires the camera parameters of the real cameras and the 3D point group acquired by the shape estimation unit 210, and estimates the distance from each real camera to the subject. Then, the distance estimation unit 220 transmits to the visibility information storage unit 230 range images that are a result of the estimation. The range image corresponding to each of the cameras is information that indicates the distance between an element of the shape model of the subject and the camera.

An example of the method of estimating the distance from the real camera to the subject and generating a range image will be described below. The range image has the same width and the same height as those of the captured image, and each pixel stores a distance value. For example, first, the coordinates $X_w$ of a point P of the 3D point group are multiplied by an external matrix $T_c$ to transform the coordinates $X_w$ into camera coordinates $X_c$ of the camera coordinate system. The external matrix $T_c$ is a matrix configured by the external parameter of the real camera. When a direction in which a lens of the real camera faces with the camera position being the origin is a positive direction of the z-axis of the camera coordinate system, a z-coordinate of the camera coordinates $X_c$ is the distance value in the case in which the point is viewed from the real camera.

Next, image coordinates $X_i$ of the camera coordinates $X_c$ are calculated to obtain the coordinates of the range image storing the distance value. The image coordinates $X_i$ are calculated by multiplying, by an internal matrix $T_i$, normalized camera coordinates obtained by normalizing the camera coordinates $X_c$ by the z-coordinate. The internal matrix $T_i$ is a matrix configured by the internal parameter of the real camera. In the case in which a previously-calculated distance value of another point is stored in the pixel of the image coordinates $X_i$, the stored value is compared with the z-coordinate of the image coordinates $X_i$. Then, if the z-coordinate is less than the stored value, the z-coordinate is stored as a new pixel value at the image coordinates $X_i$. The foregoing processing is executed on every point P of the 3D point group to generate a range image of a single real camera. Further, the foregoing processing is executed with respect to all the real cameras to generate range images of all the real cameras. The method of generating distance information about the distance between each camera and the element of the model is not limited to the above-described method. It is not required to generate distance information for every one of the cameras in the system, and it is sufficient to generate distance information for one or more of the cameras.

<Step S340>

In step S340, the visibility information storage unit 230 acquires the range images and the camera parameters of the real cameras and the 3D point group, judges the visibility of every point constituting the 3D point group, and stores results of the judgement in the HDD 104. Further, the visibility information storage unit 230 transmits the results to the virtual viewpoint image generation unit 240. While the case will mainly be described below in which the visibility of every one of the elements of the shape model of the subject from each of the cameras in the system is judged, the present exemplary embodiment is not limited to the case. The element to be judged can be a part of the elements of the shape model, and the camera to be judged can be one or more of the cameras in the system. In other words, the judgement information is acquired for at least one of the elements of the shape model representing an object shape and indicates for each of one or more captured images whether a pixel corresponding to the element is included in the captured image.

An example of the method of judging the visibility and storing a result of the judgement will be described below. First, the coordinates $X_w$ of the point P of the 3D point group are transformed into the camera coordinate system and the image coordinate system to calculate the camera coordinates $X_c$ and the image coordinates $X_i$. Then, the pixel value of the range image at the image coordinates $X_i$ is compared with the z-coordinate of the camera coordinates $X_c$ of the range image (distance from the real camera to the point). As a result of the comparison, in a case where a difference d between the pixel value of the range image and the z-coordinate is not greater than a threshold value, it is judged that the point P is visible from the real camera. On the other hand, in a case where the difference d is greater than the threshold value, it is judged that the point P is invisible from the camera. In other words, it is judged based on a result of the comparison whether a pixel corresponding to the point P is included in an image captured by the real camera. The foregoing processing is performed for every one of the real cameras to judge whether the single point P is visible from each of the real cameras. Further, the foregoing processing is performed for every one of the points of the 3D point group to generate the visibility information.

Figure 4:
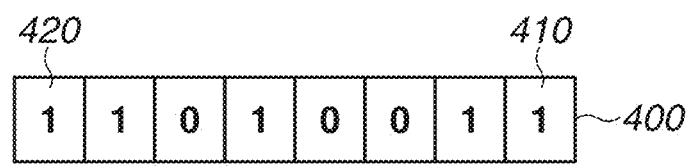
FIG. 4 illustrates an example of a bit array as visibility information.

The visibility information about each point s stored in the form of, for example, a bit array to specify the visibility for each real camera. FIG. 4 illustrates an example of a bit array 400 as the visibility information. In the bit array 400, a least significant bit 410 is the visibility information for the first real camera, and a most significant bit 420 is the visibility information for the n-th real camera of n real cameras. Each bit indicates the visibility of the point P from the corresponding real camera, and "0" indicates that the point P is invisible whereas "1" indicates that the point P is visible. For example, the bit array 400 illustrated as 8-bit in FIG. 4 indicates that the point of interest is visible from the first, second, fifth, seventh, and eighth real cameras but invisible from the third, fourth, and sixth real cameras. Such a bit array is provided for every point of the 3D point group to store the visibility information about each point in association with the point. While the visibility information is represented by 0 or 1 in the example illustrated in FIG. 4, the visibility information can be represented in multi-levels using the differences d. In this case, each point is represented to have the differences d such that the number of the differences d corresponds to the number of real cameras. Further, in the case in which the element of the shape model is a mesh, etc., similarly, visibility information having the number of bits corresponding to the number of real cameras is stored for each mesh as specified by the bit array 400 in FIG. 4. The format of the information about the visibility of the elements of the shape model that is stored in the visibility information storage unit 230 is not limited to the above-described format. For example, identification information of the camera from which an element of interest is visible or identification information of the camera from which the element of interest is invisible can be stored, or the visibility information can be stored only with respect to a frame at which a result of the judgement of the visibility of the element changes. The visibility information can be compressed by any other known data compression method and stored. In this way, the amount of data stored in the visibility information storage unit 230 is reduced to realize efficient use of the memory.

<Step S350>

In step S350, the virtual viewpoint image generation unit 240 acquires the camera parameters of the real cameras, the 3D point group, and the visibility information, and generates one or more virtual viewpoint ages. The virtual viewpoints of the one or more virtual viewpoint images can be acquired by a user operation via the input unit 106 or can be determined in advance based on the positions and orientations of the one or more virtual cameras. The method of acquiring one or more virtual viewpoints can be any other method. Lastly, the one or more generated virtual viewpoint images are output to the display apparatus 3 via the display I/F 105.

A method by which the virtual viewpoint image generation unit 240 generates a virtual viewpoint image will be described below. The virtual viewpoint image generation unit 240 determines values of pixels of the virtual viewpoint image to be generated that correspond to the element of the shape model. The values of pixels of the virtual viewpoint image are determined based on values of pixels corresponding to the element among the pixels of the captured image (image captured by the camera from which the element is visible) identified from the judgement information based on the visibility judgement. A specific example of the method of generating the virtual viewpoint image will be described below. First, the virtual viewpoint image generation unit 240 generates a foreground image (image of a region of a subject) viewed from a virtual camera and a background image (image not including the subject). Then, the virtual viewpoint image generation unit 240 combines the generated background image with the generated foreground image to generate a virtual viewpoint image.

A method of generating the foreground image of the virtual viewpoint image will be described below. The foreground image of the virtual viewpoint image is generated by coloring the 3D point group and rendering the colored 3D point group using an existing computer graphics (CG) rendering method. To color the 3D point group, first, the 3D point group and the visibility information are referred to, and the coordinates $X_w$ of the point P to be colored and the visibility information are acquired. Since the visibility information is given to each point of the 3D point group in step S340, the visibility information of the point P is acquirable using an identification number of the point P.

Next, the real camera from which the point P is visible is identified by referring to the bit array of the visibility information. The coordinates $X_w$ of the point P are transformed into the image coordinate system of the identified real camera, and the color of the point P is determined based on the pixel of the image coordinates $X_i$ on the captured camera image. In a case where the point P is visible from a plurality of real cameras, the pixel values are acquired from the images captured by the respective real cameras and, for example, a mean value of the acquired pixel values is determined as the color of the point P. The same processing is performed with respect to every point of the 3D point group to color all the points. In a case where the visibility information of the point P is represented by not the bit array of 1 or 0 but multi-level values, a weighted mean value of the pixel values acquired from the real cameras from which the point P is judged visible is determined as the color of the point P. The visibility judgement is determined by setting a threshold value as in the case of the bit array. The weight is obtainable by calculating a ratio of the differences d of the real cameras from which the point P is judged visible. How to determine the pixel value of the foreground image, however, is not limited to the above-described methods. For example, in the case where a plurality of captured images having a pixel corresponding to the element of the shape model is identified from information based on the visibility judgement, the value of the pixel of the foreground image that corresponds to the element can be determined based on the value of the pixel of the captured image that is selected from the plurality of identified captured images. Specifically, the captured image that is captured by the real camera located at the shortest distance from the element can be selected to use the pixel value of the selected image, or the plurality of captured images captured by the plurality of real cameras located at short distances from the element can be selected to calculate a pixel value of the foreground image from the pixel values of the selected images. In this method, a captured image which has a high resolution of the portion of the subject that corresponds to the element is used, so that the coloring of the shape model is performed with great accuracy. The pixel value of the foreground image can be determined by selecting and using an image captured by the real camera located at a short distance from a designated virtual viewpoint or an image captured by the real camera that captures images in an image capturing direction with a small difference from the line-of-sight direction of the designated virtual viewpoint. With these methods, a virtual viewpoint image which reproduces with great accuracy how the subject appears from the designated virtual viewpoint is generated in a case where the color or gloss of a surface of the subject varies depending on the viewing angle.

Now, the background image of the virtual viewpoint image is generated. First, in a background 3D model, for example, vertexes of a building such as an arena are set. A CG (Computer Graphics) model of the arena, etc. that is generated in advance and stored in the system can be used as the background 3D model, or the background 3D model can be generated based on images captured by the plurality of cameras. The vertexes are transformed into a camera coordinate system of two real cameras (hereinafter, "a first camera" and "a second camera") located near the virtual viewpoint and a camera coordinate system of the virtual viewpoint. Next, a first transformation matrix between the virtual viewpoint and the first camera and a second transformation matrix between the virtual viewpoint and the second camera are calculated using corresponding points of the virtual viewpoint and the first camera and corresponding points of the virtual viewpoint and the second camera, respectively. To calculate each pixel value of the background image of the virtual viewpoint, the coordinates of the pixels are transformed into the coordinate systems of the background image using the first and second transformation matrixes, and the pixel values of the transformed coordinates are acquired. A mean value of the two acquired pixel values is calculated and determined as the pixel value of the background image. The number of real cameras to be used, however, is not limited to the above-described number. In the case of using n real cameras located near the virtual viewpoint, first to n-th transformation matrixes are calculated by a similar process, and transformed coordinates are acquired using the transformation matrixes. Then, a mean value of n pixel values is determined as the pixel value of the background image. The method of generating the background image is not limited to the above-described method. For example, as in the case of generating the foreground image, the judgement information about the visibility of the element of the background 3D model is acquired, and the pixel value of the background image is determined using the pixel value of the captured image (image captured by the camera from which the element is visible) identified from the judgement information. This method reduces the possibility that a value based on the color of the foreground object is erroneously set as the pixel value of the background image.

The acquired foreground image of the virtual viewpoint image is superimposed on the acquired background image of the virtual viewpoint image to generate a virtual viewpoint image. Further, by repeating the same processing using a plurality of different pieces of the virtual viewpoint information with a same shape model (information about the 3D point group or mesh) and same visibility information (judgement information about the visibility of the element of the shape model) independent of the virtual viewpoint, a plurality of virtual viewpoint images corresponding to the plurality of virtual viewpoints of the same time point can be generated with reduced processing load.

Since the virtual viewpoint images are generated using the visibility information about the element of the shape model in the present exemplary embodiment, the visibility information storage unit 230 does not have to store the range images of all the real cameras, so that the amount of data to be stored is reduced. The acquired visibility information of the element of the shape model is information that is independent of the virtual viewpoint, so that the stored visibility information can be shared in generating the plurality of virtual viewpoint images corresponding to the plurality of virtual viewpoints of the same time point. Then, only the processing dependent of the virtual viewpoints is performed a plurality of times to generate a virtual viewpoint image, so that an increase in processing load is prevented. While the case in which the visibility information about every 3D point group constituting the shape model is stored is mainly described in the present exemplary embodiment, the present exemplary embodiment is not limited to the above-described case. For example, only the visibility information about the points of predetermined intervals can be stored, or the visibility information about the points that are less likely to appear on the virtual viewpoint images do not have to be stored.

In the first exemplary embodiment described above, the visibility information is generated and stored prior to the generation of the virtual viewpoint image and the 3D point group is colored using the stored visibility information to generate the foreground image of the virtual viewpoint. In a second exemplary embodiment, an example will be described below in which the 3D point group is colored while the visibility of the 3D point group is judged using the range images reduced in data amount to generate the foreground image of the virtual viewpoint. The hardware configuration of the image generation apparatus according to the present exemplary embodiment is similar to that illustrated in FIG. 1, so that description thereof is omitted.

[System Configuration]

Figure 5:
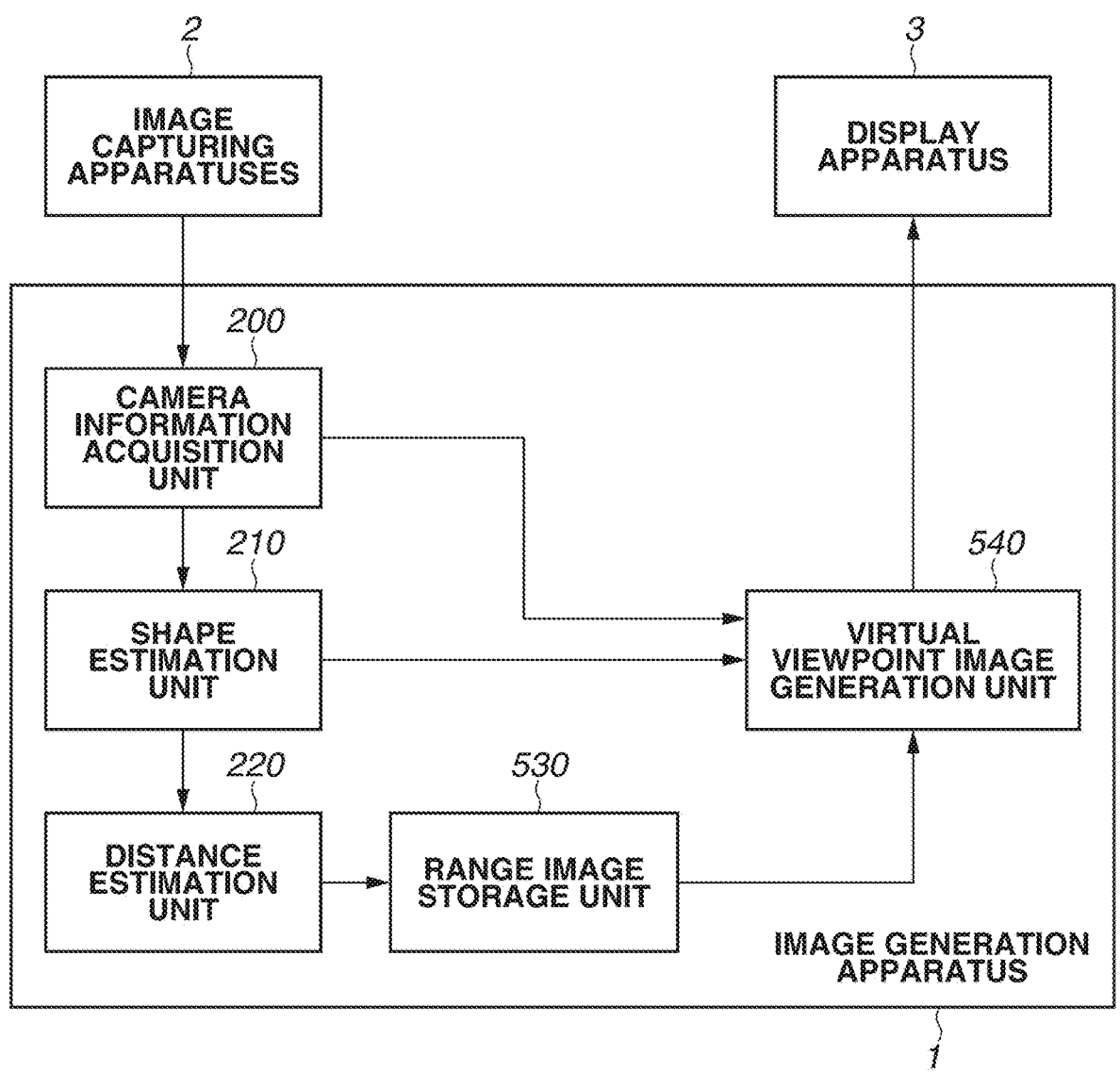
FIG. 5 is a block diagram illustrating an example of a functional configuration of an image processing system according to a second exemplary embodiment.

FIG. 5 is a block diagram illustrating an example of a functional configuration of an image processing system configured to generate and output a virtual viewpoint image in the present exemplary embodiment. The image processing system in the present exemplary embodiment includes the image generation apparatus 1, the image capturing apparatuses 2, and the display apparatus 3, as in the first exemplary embodiment.

The image generation apparatus 1 includes the camera information acquisition unit 200, the shape estimation unit 210, the distance estimation unit 220, a range image storage unit 530, and a virtual viewpoint image generation unit 540. The camera information acquisition unit 200, the shape estimation unit 210, and the distance estimation unit 220 are similar to those in the first exemplary embodiment, so that description thereof is omitted.

The range image storage unit 530 generates, as a rectangular region range image, an image of a rectangular region surrounding a subject from range images that are generated by the distance estimation unit 220 and have the same image size as the captured images, and stores the generated rectangular region range image in the HDD 104. Then, the range image storage unit 530 outputs the rectangular region range images of all the real cameras to the virtual viewpoint image generation unit 540.

The virtual viewpoint image generation unit 540 generates one or more virtual viewpoint images using the rectangular region range images. In the present exemplary embodiment, point coloring processing is performed while the visibility of each point is judged using the rectangular region range image to generate a foreground image of the virtual viewpoint. This is the difference from the processing performed by the virtual viewpoint image generation unit 240 in the first exemplary embodiment.

[Operation Process]

Figure 6:
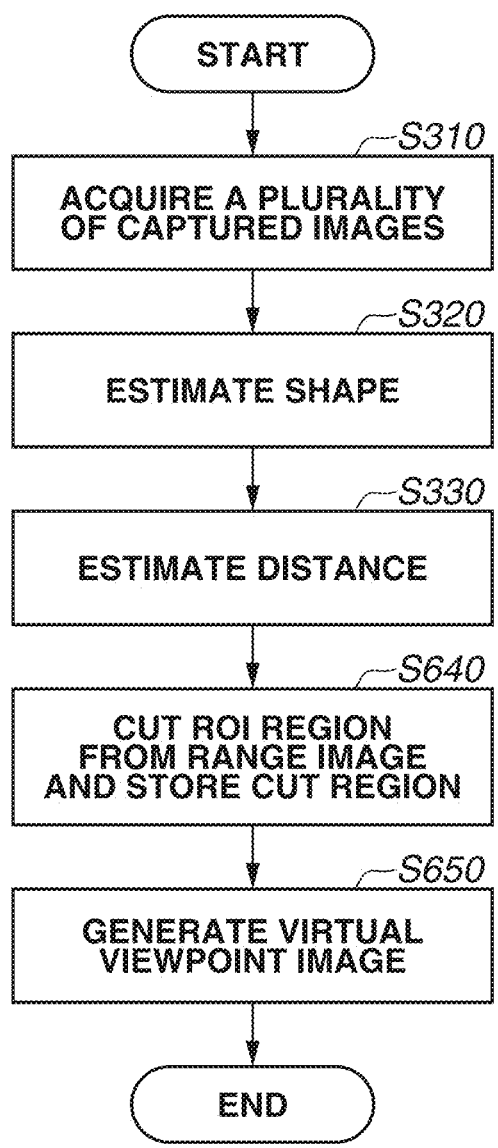
FIG. 6 is a flowchart illustrating a process of generating a virtual viewpoint image in the second exemplary embodiment.

A process of the image generation apparatus 1 according to the present exemplary embodiment will be described below with reference to a flowchart illustrated in FIG. 6. Steps S310, S320, and S330 in the flowchart in FIG. 6 are similar to those in FIG. 3 described above in the first exemplary embodiment, so that description thereof is omitted. Step S640 is a step of calculating from the range image a rectangular region surrounding the subject, performing image acquisition processing to cut the range image and acquire the rectangular region range image, and storing the acquired rectangular region range image. Step S650 is a step of coloring the points while performing the visibility judgement processing using the cut range image. Details of the processing in step S640 and the processing in step S650 will be described below.

<Step S640>

In step S640, the range image storage unit 530 acquires the range images from the distance estimation unit 220. Then, the range image storage unit 530 calculates the rectangular region surrounding the subject region in the range images of the real cameras, cuts an image of the rectangular region from the range images to generate rectangular region range images, and stores the generated rectangular region range images in the HDD 104. Further, the range image storage unit 530 transmits information about the rectangular region and the rectangular region range images to the virtual viewpoint image generation unit 540.

Figure 7:
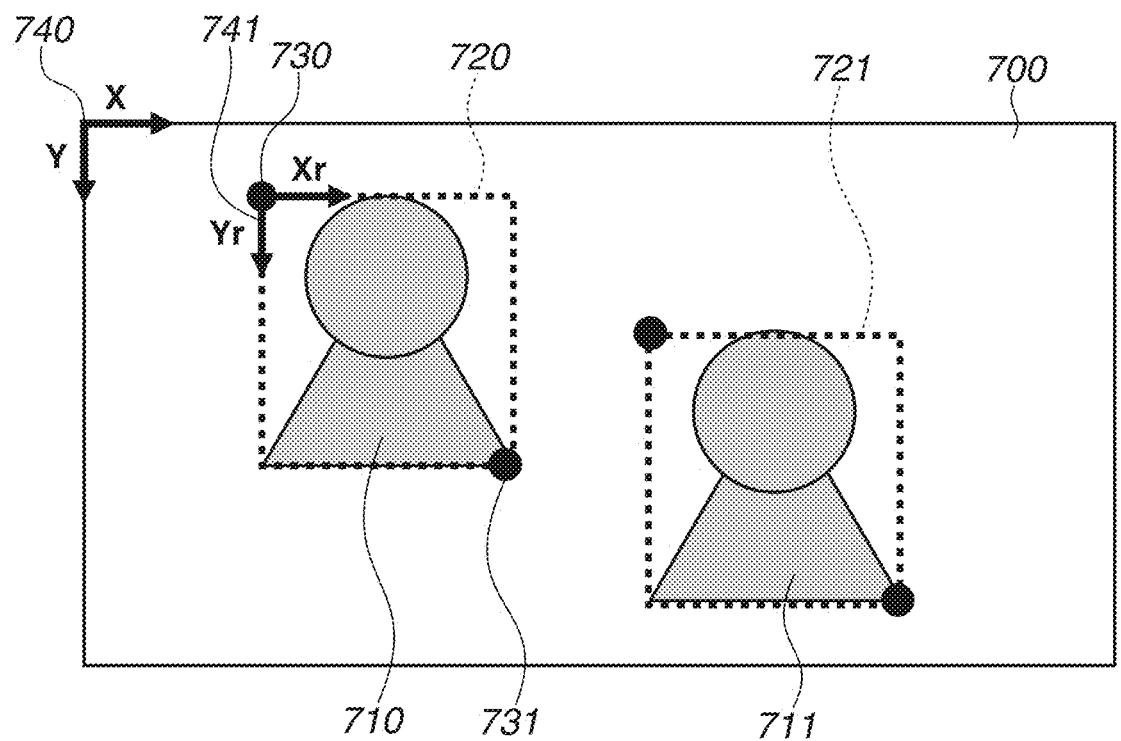
FIG. 7 illustrates rectangular regions surrounding subject regions in a range image.

A method of generating the rectangular region range image from the range images of the real cameras and storing the generated rectangular region range image will be described below. FIG. 7 illustrates rectangular regions surrounding subject regions in a range image. A range image 700 is a range image of the real camera that is generated in step S330. Existing labeling processing can be performed on the range image 700 to generate a labeling image in which subject regions 710 and 711 are labeled. Consequently, the pixel value of the subject region 710 is labeled "1", the pixel value of the subject region 711 is labeled "2", and the other pixel values are labeled "0".

A rectangular region 720 is represented by two points, vertexes 730 and 731, and the coordinates of the vertexes 730 and 731 are represented by a coordinate system 740 of the range image 700. The same applies to a rectangular region 721. The vertexes 730 and 731 are obtained by calculating a minimum value $X_{min}$ and a maximum value $X_{max}$ of the X-coordinates and a minimum value $Y_{min}$ and a maximum value $Y_{max}$ of the Y-coordinates in a pixel set of the labeling image with the pixel value "1". Consequently, the coordinates of the vertex 730 can be represented as $(X_{min}, Y_{min})$, and the coordinates of the vertex 731 as $(Y_{max}, Y_{max})$. Alternatively, the rectangular region can be calculated by performing processing similar to that described above based on the silhouette image generated by the shape estimation processing in step S320.

The rectangular region range image having the size of the acquired rectangular region as its image size is generated by copying a pixel value I(X, Y) in the rectangular region of the range image to a pixel $I_r(X_r, Y_r)$ of the rectangular region range image. The values $X_r$ and $Y_r$ are represented by a coordinate system 741 of the rectangular region range image having the vertex 730 as the origin and are calculated as $X_r=X-X_{min}$ and $Y_r=Y-Y_{min}$. In the cases in which the number of labels is two or more, rectangular region information and a rectangular region range image are generated in each label. The rectangular region information and the rectangular region range image generated for each real camera are stored with the camera number of the corresponding real camera so that the real camera that captures the range image is identifiable.

<Step S650>

In step S650, the virtual viewpoint image generation unit 540 acquires camera parameters of the real cameras, the 3D point group, the rectangular region information, and the rectangular region range image and generates a foreground image of the virtual viewpoint while judging the visibility information about each point of the 3D point group. Then, the virtual viewpoint image generation unit 540 generates a background image of the virtual viewpoint using a method similar to that in step S350, and superimposes the foreground image on the background image to generate the virtual viewpoint image. The virtual viewpoint image generation unit 540 transmits the generated virtual viewpoint image to the display apparatus 3.

A method of generating the foreground image of the virtual viewpoint while judging the visibility of each point of the 3D point group using the rectangular region range image will be described below. As in step S350, the foreground image of the virtual viewpoint image is generated by coloring the 3D point group and rendering the colored 3D point group using an existing CG rendering method. To color the 3D point group, the visibility of the coordinates $X_w$ of the point P to be colored is judged by referring to the 3D point group and information about the rectangular region range image.

In the visibility judgement, the coordinates $X_w$ of the point P of the 3D point group are transformed into the camera coordinate system and the image coordinate system to calculate the camera coordinates $X_c$ and the image coordinates $X_i$. Then, the coordinates of a start point of the rectangular region of the rectangular region range image is subtracted from the image coordinates $X_i$ to calculate the coordinates $X_j$ of the rectangular region range image. The pixel value of the rectangular region range image at the coordinates $X_j$ is compared with a z-coordinate (distance from the real camera to the point) of the camera coordinates $X_c$. As a result of the comparison, in a case where the difference d is not greater than a threshold value, it is judged that the point P is visible from the real camera, whereas in a case where the difference d is greater than the threshold value, it is judged that the point P is invisible from the real camera. The foregoing processing is performed on every one of the real cameras to generate the visibility information about the point P.

The visibility information is generated as described above to calculate the color of the point P using the method similar to that in step S350. The foregoing processing is performed on every one of the points of the 3D point group to color the 3D point group. The method of generating the background image is similar to that in the first exemplary embodiment, and the foreground image is superimposed on the background image to generate the virtual viewpoint image.

As described above, in the present exemplary embodiment, the range images of the image size of the images captured by the real cameras are not stored, and range images of the size of the rectangular regions surrounding the subject regions generated to reduce the data amount of the range images are stored. In this way, when a plurality of virtual viewpoint images of the same time point is to be generated, the visibility judgement is performed using the rectangular region range image to prevent an increase in data transfer time and data amount.

While the shape model of the subject is estimated at the image generation apparatus 1 in the above-described exemplary embodiments, the processing performed by the shape estimation unit 210 and the processing performed by the distance estimation unit 220 can be performed by another apparatus. In this case, the camera information acquisition unit 200 further acquires the 3D point group representing the shape model of the subject and the range images from the other apparatus.

The above-described exemplary embodiments are capable of generating a plurality of virtual viewpoint images with ease.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-182795, filed Sep. 22, 2017, which is hereby incorporated by reference herein in its entirety.

What is claimed is:
1. An image processing system comprising:
one or more hardware processors; and
one or more memories which store instructions executable by the one or more hardware processors to cause the image processing system to perform at least:
storing, in a storage unit, visibility information of an element of a three-dimensional shape model of an object in a capturing target region whose image is captured by a plurality of image capturing apparatuses in different positions, wherein the visibility information indicates for each of one or more captured images among a plurality of captured images obtained by the plurality of image capturing apparatuses whether a pixel corresponding to the element is included in the captured image;
acquiring viewpoint information indicating a plurality of different virtual viewpoints corresponding to same time; and
generating a plurality of virtual viewpoint images according to the plurality of different virtual viewpoints corresponding to the same time that are indicated by the acquired viewpoint information, based on the plurality of captured images, the three-dimensional shape model, and the visibility information stored in the storage unit,
wherein the generating of the plurality of virtual viewpoint images includes determining, based on a value of a pixel corresponding to the element of the three-dimensional shape model among pixels of a captured image indicated by the visibility information, a value of a pixel corresponding to the element among pixels of a virtual viewpoint image.

2. The image processing system according to claim 1, wherein the instructions further cause the image processing system to perform
generating the three-dimensional shape model based on one or more of the plurality of captured images,
wherein the generated three-dimensional shape model is stored in the storage unit in association with the visibility information.

3. The image processing system according to claim 1, wherein the instructions further cause the image processing apparatus to perform
determining whether the pixel corresponding to the element of the three-dimensional shape model is included in a captured image captured by an image capturing apparatus, based on position information about the element and a distance between the element and the image capturing apparatus,
wherein the visibility information is obtained based on the determining.

4. The image processing system according to claim 1, wherein, in a case where the visibility information indicates a plurality of captured images as the captured image including the pixel corresponding to the element of the three-dimensional shape model, the value of the pixel corresponding to the element among the pixels of the virtual viewpoint image is determined based on the value of the pixel of the captured image selected from the indicated plurality of captured images.

5. The image processing system according to claim 1, wherein the plurality of virtual viewpoint images corresponding to the plurality of different virtual viewpoints indicated by the acquired viewpoint information is generated by using the visibility information that is stored before the viewpoint information is acquired.

6. The image processing system according to claim 1, wherein the plurality of virtual viewpoint images is generated by:
generating an image of the object based on the plurality of captured images, the three-dimensional shape model, and the visibility information stored in the storage unit; and
combining the generated image of the object with a background image not including the object.

7. The image processing system according to claim 1, wherein the element of the three-dimensional shape model is a point in a case where the three-dimensional shape model is represented as a set of points in a three-dimensional space, or a mesh in a case where the three-dimensional shape model is represented as a set of meshes.

8. The image processing system according to claim 1, wherein the visibility information stored in the storage unit includes a bit array corresponding to a number of the plurality of image capturing apparatuses.

9. The image processing system according to claim 1, wherein an object corresponding to the three-dimensional shape model includes a person.

10. The image processing system according to claim 1, wherein the instructions further cause the image processing system to perform:
acquiring position information indicating a position of an element of a three-dimensional shape model of the object;
acquiring distance information indicating, with respect to a pixel corresponding to the object of a captured image captured by an image capturing apparatus included in the plurality of image capturing apparatuses, a distance between a three-dimensional position corresponding to the pixel on the object and a position corresponding to the image capturing apparatus; and
generating the visibility information based on the acquired distance information and the acquired position information.

11. The image processing system according to claim 10, wherein the distance information is acquired by extracting information about a pixel corresponding to a partial area including the object from information indicating a distance between a three-dimensional position corresponding to each pixel of an entire captured image captured by the image capturing apparatus included in the plurality of image capturing apparatuses and a position corresponding to the image capturing apparatus.

12. The image processing system according to claim 10, wherein the instructions further cause the image processing system to perform:
acquiring image capturing apparatus information indicating a position of the image capturing apparatus included in the plurality of image capturing apparatuses,
wherein the visibility information is generated based on the acquired image capturing apparatus information, the acquired distance information and the acquired position information.

13. An image processing apparatus comprising:
one or more hardware processors; and
one or more memories which store instructions executable by the one or more hardware processors to cause the image processing apparatus to perform at least:
acquiring visibility information of an element of a three-dimensional shape mode of an object in a capturing target region whose image is captured by a plurality of image capturing apparatuses in different positions, wherein the visibility information indicates for each of one or more captured images among a plurality of captured images obtained by the plurality of image capturing apparatuses whether a pixel corresponding to the element is included in the captured image;
acquiring viewpoint information indicating a plurality of different virtual viewpoints corresponding to same time; and
generating a plurality of virtual viewpoint images according to the plurality of different virtual viewpoints corresponding to the same time that are indicated by the acquired viewpoint information, based on the plurality of captured images, the three-dimensional shape model, and the acquired visibility information,
wherein the generating of the plurality of virtual viewpoint images includes determining, based on a value of a pixel corresponding to the element of the three-dimensional shape model among pixels of a captured image indicated by the visibility information, a value of a pixel corresponding to the element among pixels of a virtual viewpoint image.

14. The image processing apparatus according to claim 13, wherein, in a case where the visibility information indicates a plurality of captured images as the captured image including the pixel corresponding to the element of the three-dimensional shape model, the value of the pixel corresponding to the element among pixels of the virtual viewpoint image is determined based on a value of a pixel of the captured image selected from the indicated plurality of captured images.

15. An image processing method comprising:
- storing, in a storage unit, visibility information of an element of a three-dimensional shape model of an object in a capturing target region whose image is captured by a plurality of image capturing apparatuses in different positions, wherein the visibility information indicates for each of one or more captured images among a plurality of captured images obtained by the plurality of image capturing apparatuses whether a pixel corresponding to the element is included in the captured image;
- acquiring viewpoint information indicating a plurality of different virtual viewpoints corresponding to same time; and
- generating a plurality of virtual viewpoint images corresponding to the plurality of different virtual viewpoints according to the same time that are indicated by the acquired viewpoint information, based on the plurality of captured images, the three-dimensional shape model, and the visibility information stored in the storage unit,
- wherein the generating of the plurality of virtual viewpoint images includes determining, based on a value of a pixel corresponding to the element of the three-dimensional shape model among pixels of a captured image indicated by the visibility information, a value of a pixel corresponding to the element among pixels of a virtual viewpoint image.

16. The image processing method according to claim 15, further comprising:
- determining whether the pixel corresponding to the element is included in the captured image captured by the image capturing apparatuses based on position information about the element of the three-dimensional shape model and a distance between the element and the image capturing apparatuses,
- wherein the visibility information is obtained based on the determining.

17. The image processing method according to claim 15, further comprising:
- acquiring position information indicating a position of an element of a three-dimensional shape model of the object;
- acquiring distance information indicating, with respect to a pixel corresponding to the object of a captured image captured by an image capturing apparatus included in the plurality of image capturing apparatuses, a distance between a three-dimensional position corresponding to the pixel on the object and a position corresponding to the image capturing apparatus; and
- generating visibility information based on the acquired distance information and the acquired position information.

18. The image processing method according to claim 15, further comprising:
- acquiring image capturing apparatus information indicating a position of the image capturing apparatus included in the plurality of image capturing apparatuses,
- wherein the visibility information is generated based on the acquired image capturing apparatus information, the acquired distance information and the acquired position information.

19. A non-transitory computer-readable storage medium storing a program for causing a computer to execute an image processing method comprising:
- storing, in a storage unit, visibility information of an element of a three-dimensional shape model of an object in a capturing target region whose image is captured by a plurality of image capturing apparatuses in different positions, wherein the visibility information indicates for each of one or more captured images among a plurality of captured images obtained by the plurality of image capturing apparatuses whether a pixel corresponding to the element is included in the captured image;
- acquiring viewpoint information indicating a plurality of different virtual viewpoints corresponding to same time; and
- generating a plurality of virtual viewpoint images corresponding to the plurality of different virtual viewpoints according to the same time that are indicated by the acquired viewpoint information, based on the plurality of captured images, the three-dimensional shape model, and the acquired visibility information,
- wherein the generating of the plurality of virtual viewpoint images includes determining, based on a value of a pixel corresponding to the element of the three-dimensional shape model among pixels of a captured image indicated by the visibility information, a value of a pixel corresponding to the element among pixels of a virtual viewpoint image.

* * * * *